United States Patent
Lin

(10) Patent No.: US 10,175,506 B2
(45) Date of Patent: Jan. 8, 2019

(54) TYPE OF PRESBYOPIC LENS

(71) Applicant: Xiaoting Chen, Longyan (CN)

(72) Inventor: Shih-Hsien Lin, Longyan (CN)

(73) Assignee: Xiaoting Chen, Longyan (CN)

( * ) Notice: Subject to any disclaimer, the term of this patent is extended or adjusted under 35 U.S.C. 154(b) by 0 days.

(21) Appl. No.: 15/291,085

(22) Filed: Oct. 12, 2016

(65) Prior Publication Data
US 2017/0212364 A1    Jul. 27, 2017

(30) Foreign Application Priority Data

Jan. 27, 2016  (CN) .................... 2016 2 0078129 U

(51) Int. Cl.
*G02C 7/06* (2006.01)
*G02C 7/02* (2006.01)

(52) U.S. Cl.
CPC ............. *G02C 7/066* (2013.01); *G02C 7/022* (2013.01)

(58) Field of Classification Search
CPC ........ G02C 7/041; G02C 7/042; G02C 7/043; G02C 7/044; G02C 7/045; G02C 7/061; G02C 7/066

USPC .......................... 351/159.06, 159.12, 159.42
See application file for complete search history.

(56) References Cited

U.S. PATENT DOCUMENTS

| | | | |
|---|---|---|---|
| 6,183,084 B1* | 2/2001 | Chipman | G02C 7/061 351/159.52 |
| 2006/0028616 A1* | 2/2006 | Lam | G02C 7/06 351/159.42 |

* cited by examiner

*Primary Examiner* — Darryl J Collins
(74) *Attorney, Agent, or Firm* — Adsero IP

(57) ABSTRACT

The present disclosure involves the field of optical lenses, and particularly a type of auto-focusing presbyopic lens for people suffering from light to moderate presbyopia. The lens employs a structure wherein the thickness gradually gets smaller from the center to the edge, and the power of the lens gradually increases from 0 D on the edge to +2.00 D in the center. The length of the progressive passage on the lens is 28-36 mm, the central thickness of the lens is 1.2 mm, and the peripheral thickness is 0.5 mm. In some embodiments, the central thickness of the lens may be 2.4 mm and the peripheral thickness may be 1.0 mm. The invention fully considers the facial features of Asians, and employs an appropriate minimum assembly height while the structure, wherein the thickness gradually gets smaller from the center to the edge, conforms to the daily viewing habits of the elderly population.

5 Claims, 2 Drawing Sheets

TYPE OF PRESBYOPIC LENS

FIELD OF THE INVENTION

The invention involves the field of optics lens, particularly a type of auto-focusing presbyopic lens for people suffering from light and moderate presbyopia.

BACKGROUND OF THE INVENTION

As a type of lenses specially designed for people suffering from presbyopia, the auto-focusing lens employs a series of continuous and uninterrupted horizontal smooth curve chains covering long range use, middle range use and short range use. The curvature along the meridian lenses consecutively increases from the upper part to the bottom of the lens, which not only resolves eyesight correction in long range, middle range and short range, but also eliminates image jitter. Auto-focusing lenses are the same as single vision lenses in appearance without any dividing line on the surface of the lens, which helps remove distasteful feeling of some users.

It is already very common for people suffering from presbyopia to wear progressive multi-focus lenses in European and American countries. However, high price over one thousand yuan deters many Chinese consumers. It is the responsibilities of China's lens-processing enterprises to serve Chinese people suffering from presbyopia by providing a type of economical and practical auto-focusing lens. Presently, the majority of aged people in China suffer from presbyopia only, and myopia sufferers take a very small proportion. It is too expensive for them to buy progressive multi-focus lenses, and troublesome for them to frequently take off and wear ordinary presbyopic glasses. Hence, auto-focusing lenses offer a best option for these Chinese people suffering from presbyopia. The auto-focusing lens involved in the invention is subject to optimized design, which lowers the cost of production to a maximum extent, enables the manufacturing price of lenses to drop significantly and satisfies the visual demand of people suffering from presbyopia in the mean time.

SUMMARY OF THE INVENTION

The invention is intended for overcoming the disadvantages of the prior art, providing a type of auto-focusing presbyopic lenses for people suffering from light and moderate presbyopia at a lower price.

The detailed scheme is stated as below: A type of auto-focusing presbyopic lens, which is characterized in that the stated auto-focusing presbyopic lens employs a structure where the thickness gradually gets smaller from the center to the edge, and the power of the lens gradually increases from 0 D on the edge to +200 D in the center. Wherein the length of the progressive passage on the stated auto-focusing presbyopic lens is 28-36 mm.

Wherein the central thickness of the stated auto-focusing presbyopic lens is 1.2 mm, and the peripheral thickness is 0.5 mm; the optional material of the stated auto-focusing presbyopic lens is glass or high molecular material.

The invention fully considers the face feature of Asians, and employs an appropriate minimum assembly height while the periphery-to-center progressive design conforms to the daily viewing habit of elder population.

BRIEF DESCRIPTION OF THE DRAWINGS

Drawing 1 is the front view of auto-focusing presbyopic lenses in an embodiment of the invention.

Drawing 2 is the side view of the embodiments.

DETAILED DESCRIPTION OF THE PREFERRED EMBODIMENTS

Accompanying drawings are offered for the invention to further describe each embodiment. As a part of the disclosed contents of the invention, these accompanying drawings are used to mainly describe embodiments, and to explain the operation principle of embodiments in combination with the relevant description of the Specifications. Ordinary technical personnel in the field shall be able to understand other possible description of embodiments as well as the advantages of the invention by reference to theses contents. Further descriptions are given on the invention in connection with the accompanying drawings and detailed description of the preferred embodiments.

Figure 1:
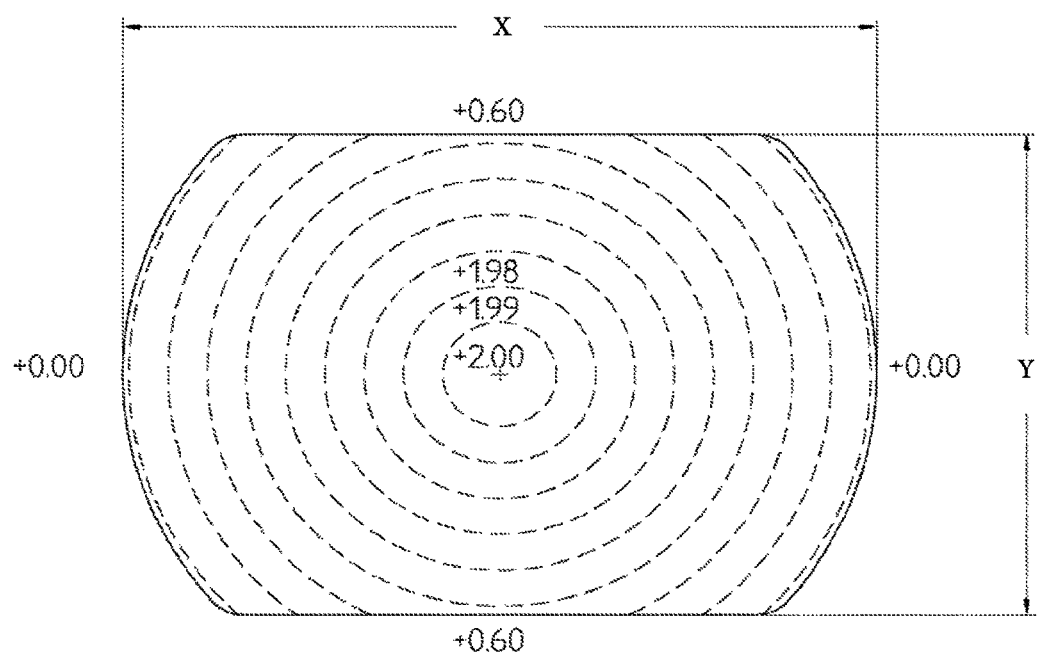
Figure 2:
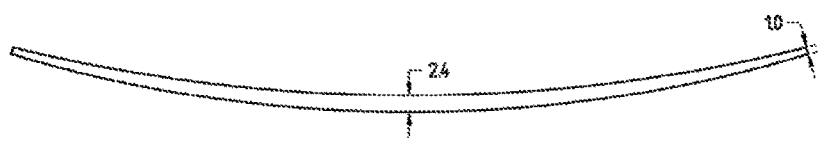

The lenses shown in FIG. 1 are accomplished after raw materials are injected into moulds for going through such processes as demoulding, edge grinding, cleaning, hardening, coating and inspection following a solidification procedure. A resin is adopted for the lens to improve the compression resistance thereof. The lens is configured to have a lens power of 0.00 D on the left and right edges, 0.60 D on the upper and lower sides, and 2.00 D in the center. Since the power of the lens gradually increases from around the edges to the center, the outer area of the lens can be regarded as a plain zone and the center area as a presbyopia zone. In some embodiments, the horizontal length of the lens ("X") is 56 mm and the vertical length ("Y") is 39 mm; the progressive passage is 28-36 mm in length, such that the facial form of Asians is better fitted.

A side view is given for the auto-focusing presbyopic lens involved in the embodiments in connection with Drawing 2. The central thickness of the lens is 1.2 mm and the edge thickness is 0.5 mm.

Although the invention is specifically illustrated and introduced in connection with the preferred embodiments, technical personnel in the field should understand that any changes or modifications made to the invention in either form or detail fall within the scope of protection of the invention without departing from the principle and scope of the invention as defined in the attached Claims.

The invention claimed is:

1. An auto-focusing presbyopic lens comprising:
a structure including a plain zone and a presbyopia zone, wherein a thickness of the structure gradually gets smaller from a center of the structure to an edge of the structure,
wherein in the presbyopia zone, a power of the auto-focusing presbyopic lens gradually increases from 0.0 D on the edge of the structure to +2.00 D in the center of the structure, wherein the gradual increase occurs over a progressive passage length between 28-36 mm.

2. The auto-focusing presbyopic lens according to claim 1, wherein the structure further comprises an upper side and lower side, wherein in the presbyopia zone the power of the lens gradually increases from 0.60 D on each of the upper and lower sides of the structure to +2.00 D in the center of the structure.

3. The auto-focusing presbyopic lens according to claim 1, wherein the structure has a central thickness of 1.2 mm, and a peripheral thickness at the edge of the structure of 0.5 mm.

4. The auto-focusing presbyopic lens according to claim 1, wherein the stated auto-focusing presbyopic lens includes a glass or high molecular material.

5. The auto-focusing presbyopic lens according to claim 1, wherein the gradual increase in the power of the auto-focusing presbyopic lens occurs in increments of +0.01 D over the progressive passage length.

* * * * *